னitle# 2,813,870

ISONICOTINYLDITHIOCARBAZATES

Richard E. Strube, Kalamazoo, Mich., assignor to The Upjohn Company, Kalamazoo, Mich., a corporation of Michigan No Drawing. Application May 26, 1955, Serial No. 511,407

10 Claims. (Cl. 260—270)

This invention relates to novel organic compounds, more particularly to 3-isonicotinyldithiocarbazates.

Although dithiocarbazates have been prepared by reacting hydrazides with carbon disulfide and alkali, and although isonicotinylhydrazide, and benzoyldithiocarbazates, Busch, J. prakt. Chém. [2] 93, 25–72 (1916), were known, the 3-isonicotinyldithiocarbazates were not known heretofore. The free dithiocarbazic acids are unstable and have not been isolated.

The 3-isonicotinyldithiocarbazates of this invention are represented by the formula:

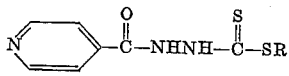

wherein R is a radical selected from the group consisting of heavy metals, alkalinous metals, and lower hydrocarbon. The term "heavy metals" as used herein embraces titanium, chromium, manganese, iron, cobalt, nickel, copper, zinc, mercury, arsenic, antimony, and bismuth, exclusively. The term "alkalinous metals" includes the alkali metals (e. g., sodium, potassium, and lithium) and the alkaline earth metals (e. g., calcium, strontium, barium, and magnesium) exclusively. The term "lower hydrocarbon," as used herein, includes lower alkyl and lower aralkyl hydrocarbon radicals containing less than nine carbon atoms.

It is an object of this invention to provide novel 3-isonicotinyldithiocarbazates. It is a further object to provide 3-isonicotinyldithiocarbazates having utility as rubber accelerators, insecticides, fungicides, and therapeutics.

Preparation of the 3-isonicotinyldithiocarbazate salts of this invention is conveniently accomplished by reacting isonicotinic acid hydrazide with carbon disulfide and a base. Temperatures from room temperature, or below, up to the reflux temperature are suitable, with a temperature of 45 to 60 degrees centigrade, inclusively, being preferred. The base may be an inorganic base, for example, lithium, sodium, potassium, calcium, or magnesium hydroxide, or lithium, sodium, potassium or ammonium carbonate. The reaction takes place most conveniently in the presence of water although alcohols such as methanol, ethanol and isopropanol, are also useful as reaction media.

The 3-isonicotinyldithiocarbazate salts of metals which do not yield strong bases are prepared by reacting a water solution of an alkali metal 3-isonicotinyldithiocarbazate with an inorganic, suitably a halide, water-soluble or aqueous hydrohalic acid-soluble salt of the desired metal. Utilizable, therefore, are the inorganic water-soluble salts, especially the chlorides and bromides, of calcium; magnesium; titanium (Ti+++ and Ti++++); chromium (Cr++ and Cr+++); manganese (Mn++); iron (Fe++ and Fe+++); cobalt (Co++); nickel (Ni++); copper (Cu++); zinc; mercury (Hg++); arsenic (As+++); antimony (Sb+++); and bismuth (Bi+++); in accordance with Examples 3 and 4.

The lower hydrocarbon 3-isonicotinyldithiocarbazate esters are suitably prepared by reacting a water-soluble salt, such as the potassium 3-isonicotinyldithiocarbazate, with a lower hydrocarbon halide; illustratively methyl, ethyl, propyl, butyl, hexyl, octyl, cyclopentyl, cyclohexyl, cyclohexylethyl, benzyl and phenethyl chloride, bromide, or iodide may be used as in Examples 5, 6 and 7.

The 3-isonicotinyldithiocarbazate salts and esters of this invention are effective accelerators for the vulcanization of rubber, and can be used advantageously in rubber tread compounds, latex compounds, or other conventional vulcanizable rubber compounds. The term "rubber" as used herein includes natural rubber and synthetic rubber, examples of the latter being polybutadiene rubber, polyisoprene synthetic rubber, rubber copolymers of a butene and a diolefin, and rubbery polymers derived from butadiene, such as copolymers of butadiene and acrylonitrile and copolymers of butadiene and styrene. Preferred as accelerators are the zinc and alkalinous salts and esters. Utility is further demonstrated by these compounds being useful fungicides and antimicrobial agents. Illustratively, five micrograms of sodium 3-isonicotinyldithiocarbazate per milliliter causes complete inhibition of Mycobacterium tuberculosis (H37Rv) in vitro. The compounds of this invention can be used as agricultural protectants in compositions and applied as common in the art, illustrated specifically in U. S. Patent 2,635,978. The non-toxic metal salts and esters are utilizable in substantially the same manner as disclosed in Fox U. S. Reissue Patent 23,947.

The following examples are illustrative of the present invention and are not to be construed as limiting.

*Example 1.—Sodium 3-isonicotinyldithiocarbazate*

In a liter three-necked round-bottomed flask, provided with a mechanical stirrer, a reflux condenser, an adapter for a dropping funnel, and a thermometer, 69.0 grams (0.50 mole) of isonicotinic acid hydrazide was dissolved in 375 milliliters of water. To this solution was added twenty grams (0.50 mole) of sodium hydroxide pellets in 25 milliliters of water. The clear solution was warmed to 40 to 43 degrees centigrade and 38 grams (0.50 mole) of carbon disulfide was added dropwise during thirty minutes with vigorous stirring. After the addition of the carbon disulfide, stirring and heating at 35 to 43 degrees centigrade were continued for two hours. The yellow reaction mixture was then transferred to a twelve-liter container and diluted with ten liters of acetone. A yellow product precipitated. Crystallization was continued for twenty hours and the precipitate was removed by filtration, washed with acetone and vacuum dried to give 30.1 grams of solid, sodium-3-isonicotinyldithiocarbazate, having an infrared spectrum with strong absorption bands at 1460 and 962 reciprocal centimeters characteristic of the —CS$_2$Na group.

*Analysis.*—Calculated for C$_7$H$_6$N$_3$NaOS$_2$.H$_2$O: C, 33.19; H, 3.18; N, 16.59. Found: C, 33.31; H, 3.94; N, 16.35.

This product showed complete in vitro inhibition of *Mycobacterium tuberculosis* (H37Rv) at five micrograms per milliliter In vivo tests in mice gave a maximum tolerated dose of 350 milligrams per kilogram per day subcutaneously and 600 milligrams per kilogram per day orally. A group of mice previously infected with *Mycobacterium tuberculosis* (H37Rv) was treated subcutaneously with 175 milligrams of this product per kilogram per day for ten days; another group of similarly infected mice was treated orally with 300 milligrams per kilogram per day for ten days. Survivorship was 100 percent in each instance.

Example 2.—Potassium 3-isonicotinyldithiocarbazate

In a 250-milliliter three-necked, round-bottomed flask provided with a stirrer, a reflux condenser, and a thermometer, 13.7 grams (0.100 mole) of isonicotinic acid hydrazide was dissolved in 100 milliliters of methanol. To this solution were added 7.0 grams (0.051 mole) of powdered anhydrous potassium carbonate and 10.0 grams (0.131 mole) of carbon disulfide. The mixture was stirred and heated at sixty degrees centigrade for four hours. The resulting precipitate was removed by filtration and dried in vacuum at room temperature over potassium hydroxide. The thus-obtained product, weighing 20.0 grams, was dissolved in twenty milliliters of water at room temperature and the solution was filtered to remove a small amount of extraneous material. The yellow filtrate was mixed with forty milliliters of absolute alcohol and filtered to separate a white solid precipitate which was dried in vacuum at room temperature over potassium hydroxide to yield 10.5 grams of potassium 3-isonicotinyldithiocarbazate having an analysis as follows:

Analysis.—Calculated for $C_7H_6KN_3OS_2$: N, 16.72. Found: N, 16.48.

Example 3.—Zinc 3-isonicotinyldithiocarbazate

In a 100-milliliter Erlenmeyer flask containing twenty milliliters of water and 6.0 grams (0.024 mole) of potassium 3-isonicotinyldithiocarbazate, there was added, dropwise with stirring, a clear solution of 1.5 grams (0.0074 mole) of zinc chloride in twenty milliliters of water and five milliliters of 0.1 N hydrochloric acid. The resulting yellow precipitate was removed by filtration, washed successively with sixty milliliters of water in small portions, fifty milliliters of alcohol, and fifty milliliters of ether. The residue was then dried in vacuum at room temperature to yield 4.5 grams of zinc 3-isonicotinyldithiocarbazate.

Analyis.—Calculated for $C_{14}H_{12}N_6O_2S_4Zn \cdot 2H_2O$: Zn, 12.67. Found: Zn, 12.0.

Example 4.—Antimony 3-isonicotinyldithiocarbazate

In a 100-milliliter Erlenmeyer flask, containing 6.0 grams (0.024 mole) of potassium 3-isonicotinyldithiocarbazate dissolved in twenty milliliters of water, there was added dropwise, with stirring, a clear solution of 1.5 grams (0.0066 mole) of antimony trichloride in five milliliters of concentrated hydrochloric acid. After 2.5 milliliters of the antimony trichloride solution had been added, an additional ten milliliters of water was added to the reaction mixture. When all of the antimony trichloride solution had been added, ten more milliliters of water was added. The resulting precipitate was removed by filtration and washed with small portions, to a total of fifty milliliters, of alcohol, followed by washing with ether. The orange-yellow residue was dried in vacuum at room temperature to yield 4.0 grams of antimony 3-isonicotinyldithiocarbazate.

Analysis.—Calculated for $C_{21}H_{18}N_9O_3S_6Sb \cdot 3H_2O$: Sb, 14.98. Found Sb, 14.4.

Example 5.—Methyl 3-isonicotinyldithiocarbazate

In a 100-milliliter round-bottomed flask containing 1.5 grams of potassium 3-isonicotinyldithiocarbazate in 5 milliliters of water, was added, at once, 4.2 grams of methyl iodide. The flask was stoppered and shaken, with external cooling, to maintain the temperature at about room temperature, for one hour. The resulting precipitate was then removed by filtration, washed with water, and dried in vacuum at sixty degrees centigrade to give 5.1 grams of methyl 3-isonicotinyldithiocarbazate having after two recrystallizations from ethanol and one recrystallization from ethyl acetate, a melting point, with decomposition, of 185 to 186 degrees centigrade.

Analysis.—Calculated for $C_8H_9N_3OS_2$: C, 42.27; H, 3.98; N, 18.49; I, 0. Found: C, 43.03; H, 3.92; N, 18.56; I, 0.09.

Example 6.—Ethyl 3-isonicotinyldithiocarbazate

Reacting ten grams of potassium 3-isonicotinyldithiocarbazate dissolved in sixteen milliliters of water and 6.2 grams of ethyl iodide for 24 hours, without external cooling, produced a precipitate which was filtered, washed with water, and dried in vacuum at sixty degrees centigrade, to yield 4.9 grams of ethyl 3-isonicotinyldithiocarbazate which, after crystallization twice from alcohol and once from ethyl acetate, melted with decomposition at 169 degrees centigrade.

Example 7.—Butyl 3-isonicotinyldithiocarbazate

Proceeding as in Example 6, using butyl iodide in place of ethyl iodide, at a temperature of about sixty to seventy degrees centigrade, produced butyl 3-isonicotinyldithiocarbazate.

Example 8.—Benzyl 3-isonicotinyldithiocarbazate

Otherwise like Example 7, using benzyl bromide in place of ethyl iodide, produced benzyl 3-isonicotinyldithiocarbazate.

Example 9.—Rubber accelerator

Sodium 3-isonicotinyldithiocarbazate as accelerator is compounded with synthetic rubber (GR-S, a butadiene-styrene copolymer) according to the following formula, parts by weight:

| | |
|---|---|
| GR-S | 100 |
| EPC black | 50 |
| Zinc oxide | 5 |
| Coal tar softener | 5 |
| Sulfur | 2 |
| Sodium 3-isonicotinyldithiocarbazate | 1 |

The composition thus prepared is vulcanized by heating in a press for 45 minutes at a temperature of 307 degrees Fahrenheit. The resulting vulcanizate has good tensile strength, modulus of elasticity, and ultimate elongation.

Example 10.—Rubber accelerator

Zinc 3-isonicotinyldithiocarbazate as accelerator is compounded with smoked sheet rubber according to the following formula, parts by weight:

| | |
|---|---|
| Smoked sheet | 100 |
| Zinc oxide | 5 |
| Stearic acid | 1 |
| Sulfur | 3 |
| Zinc 3-isonicotinyldithiocarbazate | 1 |

The composition thus prepared is vulcanized by heating in a press for 45 minutes at a temperature of 287 degrees Fahrenheit. The resulting vulcanizate has good tensile strength, modulus of elasticity, and ultimate elongation.

Examples 9 and 10 are illustrative of specific uses of the accelerators of this invention. The compounds of this invention are useful as accelerators and can be substituted for the specific accelerators used in Examples 9 and 10. The accelerators of this invention can be used alone, or in combination with each other, or with other accelerators such as 2-mercaptobenzothiazole, 2,2'-dithiobisbenzothiazole, and 2-benzothiazolyl diethyldithiocarbamate. The accelerators of this invention can be incorporated into rubber compounds by mastication or milling, or in the case of latex or other dispersions or solutions, by dissolving or suspending the accelerators therein. The accelerators of this invention can be used in as low a concentration as 0.25 percent of the rubber in the compound, generally with about five percent of sulfur, or in as high a concentration as five percent with a lower percent of sulfur. Although sulfur is ordinarily preferred as vulcanizing agent, also useful are other conventional sulfur-bearing vulcanizing agents susceptible to acceleration, such as tetramethylthiuram disulfide, polysulfides of phenols and cresols, and diethyl xanthogen disulfide. The accelerators of this invention can be used in conjunction with compounding agents known to the rubber art, such as antioxidants, fatty acids, softeners, activators, retarders, fillers, and pigments. The rubber compositions can be vulcanized in the presence of the new accelerators using any desired source of heat, such as heated molds, steam, hot water, or hot air.

It is to be understood that the invention is not to be limited to the exact details of operation or exact organisms and compounds shown and described, as obvious modifications and equivalents will be apparent to one skilled in the art, and the invention is therefore to be limited only by the scope of the appended claims.

I claim:

1. 3-isonicotinyldithiocarbazate of the formula:

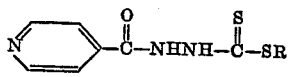

wherein R is a radical selected from the group consisting of zinc, antimony, alkalinous metals, and lower alkyl and lower arakyl hydrocarbon radicals.

2. Antimony 3-isonicotinyldithiocarbazate.
3. Zinc 3-isonicotinyldithiocarbazate.
4. An alkalinous metal 3-isonicotinyldithiocarbazate.
5. An alkaline earth metal 3-isonicotinyldithiocarbazate.
6. An alkali metal 3-isonicotinyldithiocarbazate.
7. Sodium 3-isonicotinyldithiocarbazate.
8. Potassium 3-isonicotinyldithiocarbazate.
9. A lower alkyl 3-isonicotinyldithiocarbazate ester.
10. Methyl 3-isonicotinyldithiocarbazate.

References Cited in the file of this patent

J. A. C. S., v. 75, April 1953 (effective date 1952), pp. 1933–1942 (Yale et al.).